(12) United States Patent
Nobuki et al.

(10) Patent No.: US 10,935,497 B2
(45) Date of Patent: Mar. 2, 2021

(54) DETECTION DEVICE FOR LUMINESCENCE ANALYSIS AND AUTOMATED ANALYZER

(71) Applicant: HITACHI HIGH-TECHNOLOGIES CORPORATION, Tokyo (JP)

(72) Inventors: Shunichiro Nobuki, Tokyo (JP); Muneo Maeshima, Tokyo (JP); Kenta Imai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 340 days.

(21) Appl. No.: 15/736,797

(22) PCT Filed: Jul. 13, 2016

(86) PCT No.: PCT/JP2016/070734
§ 371 (c)(1),
(2) Date: Dec. 15, 2017

(87) PCT Pub. No.: WO2017/018221
PCT Pub. Date: Feb. 2, 2017

(65) Prior Publication Data
US 2018/0188181 A1    Jul. 5, 2018

(30) Foreign Application Priority Data

Jul. 30, 2015 (JP) .............................. JP2015-151262

(51) Int. Cl.
*G01N 21/76* (2006.01)
*G01N 21/00* (2006.01)
(Continued)

(52) U.S. Cl.
CPC ......... *G01N 21/76* (2013.01); *G01N 21/0303* (2013.01); *G01N 21/253* (2013.01);
(Continued)

(58) Field of Classification Search
None
See application file for complete search history.

(56) References Cited

U.S. PATENT DOCUMENTS

| 6,404,953 B1 * | 6/2002 | Wach | G01N 21/474 |
| | | | 385/31 |
| 7,713,486 B2 * | 5/2010 | Klein | C12M 23/12 |
| | | | 422/552 |

(Continued)

FOREIGN PATENT DOCUMENTS

| EP | 2 565 629 A1 | 3/2013 |
| JP | 49-24492 A | 3/1974 |

(Continued)

OTHER PUBLICATIONS

Extended European Search Report received in corresponding European Application No. 16830326.1 dated Dec. 11, 2018.
(Continued)

*Primary Examiner* — Neil N Turk
(74) *Attorney, Agent, or Firm* — Mattingly & Malur, PC

(57) ABSTRACT

A highly reflective light-guide system has a highly reflective light-guide surface for reflecting light that has been emitted from a sample and has entered from an entry port opposing a window material and propagating the same to an exit port opposing a light reception surface of a photodetector. An optical filter is provided in a space surrounded by the window material, the photodetector, and the highly reflective light-guide system and transmits the signal luminescence to be measured that is emitted from the sample between the window material and photodetector. The optical filter is fixed to the window material or photodetector by an adhesive, and the peripheral shape of the optical filter is smaller than the shape of the inside of a fitting part to which the optical filter is fitted and that is formed on the highly reflective light-guide system.

8 Claims, 9 Drawing Sheets

(51) Int. Cl.
*G01N 21/64* (2006.01)
*G02B 6/26* (2006.01)
*G01N 21/25* (2006.01)
*G02B 6/42* (2006.01)
*G01N 21/03* (2006.01)
*F21V 8/00* (2006.01)
*G01N 35/10* (2006.01)

(52) U.S. Cl.
CPC ..... *G01N 21/6452* (2013.01); *G01N 35/1002* (2013.01); *G02B 6/0096* (2013.01); *G02B 6/26* (2013.01); *G02B 6/4298* (2013.01); *G01N 2021/6471* (2013.01); *G01N 2201/08* (2013.01)

(56) References Cited

U.S. PATENT DOCUMENTS

| | | | | |
|---|---|---|---|---|
| 2003/0063851 A1* | 4/2003 | Hillendahl | ............ | G01N 21/253 385/31 |
| 2009/0159803 A1* | 6/2009 | Berthold | ............ | G01J 3/02 250/363.01 |
| 2012/0018650 A1* | 1/2012 | Toishi | ............ | G01N 15/147 250/458.1 |
| 2012/0027642 A1 | 2/2012 | Berthold et al. | | |
| 2013/0052080 A1 | 2/2013 | Tanoue | | |
| 2015/0031570 A1 | 1/2015 | Wagner et al. | | |

FOREIGN PATENT DOCUMENTS

| | | |
|---|---|---|
| JP | 63-8649 U | 1/1988 |
| JP | 2003-28790 A | 1/2003 |
| JP | 2011-232132 A | 11/2011 |
| JP | 2015-014496 A | 1/2015 |

OTHER PUBLICATIONS

International Search Report of PCT/JP2016/070734 dated Oct. 4, 2016.

International Preliminary Report on Patentability received in corresponding International Application No. PCT/JP2016/070734 dated Feb. 8, 2018.

* cited by examiner

101: CELL BASE (MEMBER)
104: WINDOW MATERIAL
106: PHOTODETECTOR
201: HIGHLY REFLECTIVE
     LIGHT-GUIDE SYSTEM
203: OPTICAL FILTER

FIG. 2
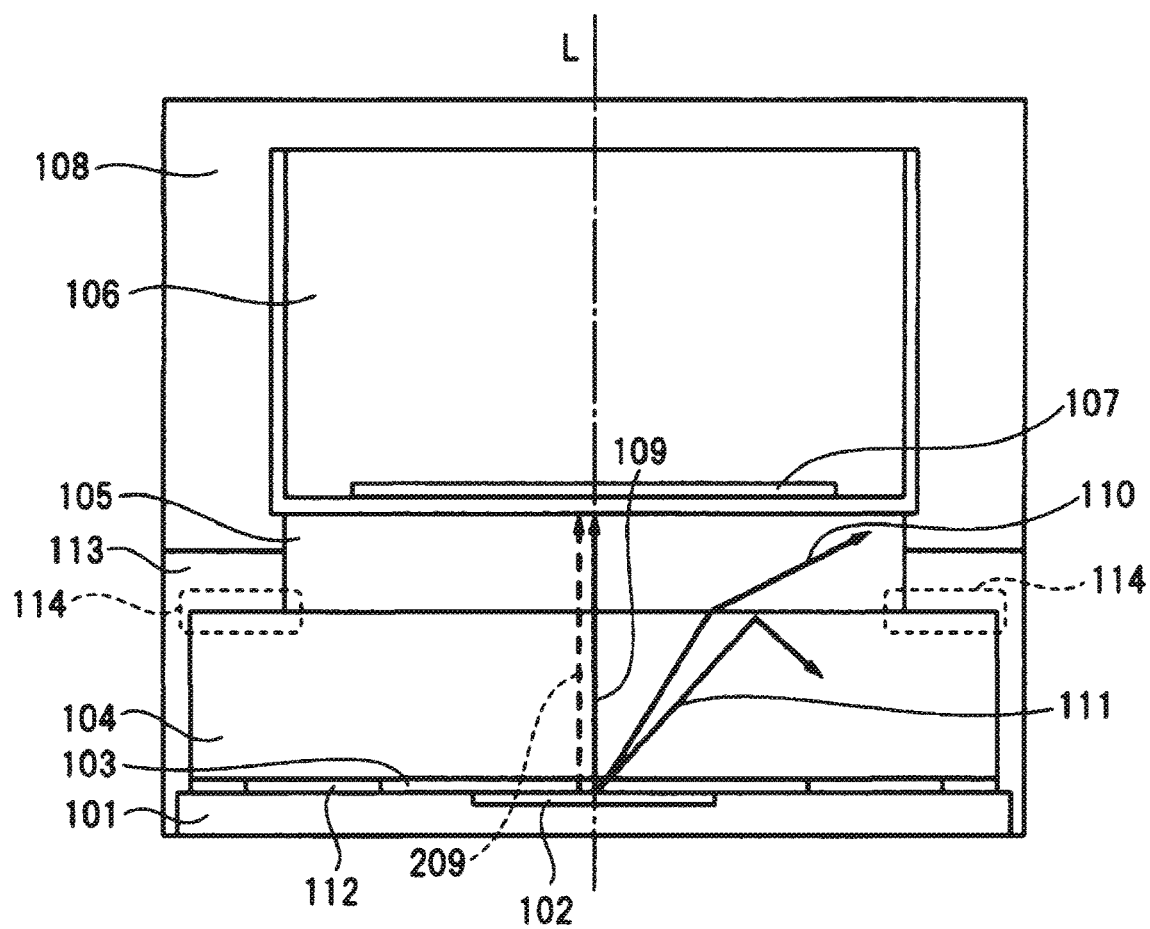
FIG. 3
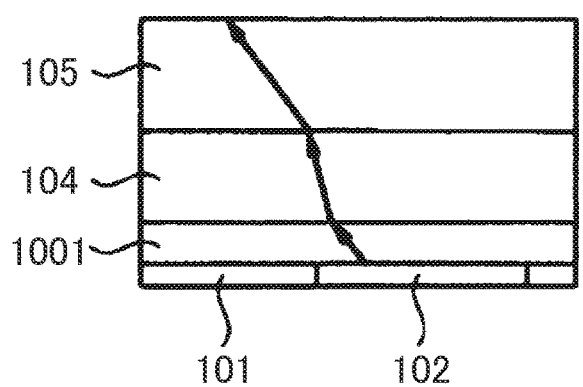
AIR LAYER n = 1.00
WINDOW MATERIAL n = 1.49
AIR LAYER n = 1.00
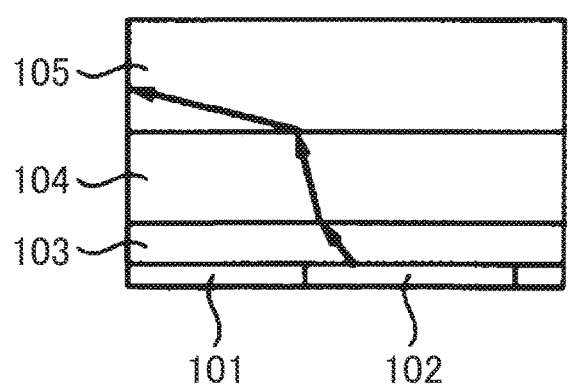
AIR LAYER n = 1.00
WINDOW MATERIAL n = 1.49
WATER n = 1.33

DETECTION DEVICE FOR LUMINESCENCE ANALYSIS AND AUTOMATED ANALYZER

TECHNICAL FIELD

The present invention relates to a detection device for luminescence analysis and an automated analyzer, particularly to an art of effectively inhibiting deterioration of a lower limit of quantification in the detection device for luminescence analysis.

BACKGROUND ART

Patent Literature 1 discloses an art related to a detection device for luminescence analysis, for example. An automated analyzer in Patent Literature 1 has an object to be capable of stably detecting even a trace of a reaction liquid in a high SN (Signal/Noise) ratio.

To detect light from a reaction liquid containing a luminescence substance by using a photodetector via an optical window, process the detection output, and analyze an amount of the luminescence substance in the reaction liquid, a light transmission optical system is provided. The light transmission optical system includes, between the optical window and photodetector, an entry port opposing the optical window, an exit port opposing a light reception surface of the photodetector, and a reflective surface that reflects the light entering the entry port and propagates the reflected light to the exit port. Thus, influence of the noise due to temperature from a flow cell is reduced while inhibiting a decrease in the amount of the light from the luminescence substance, achieving analysis with a high SN ratio.

CITATION LIST

Patent Literature

Patent Literature 1: Japanese Unexamined Patent Application Publication 2011-232132

SUMMARY OF INVENTION

Technical Problem

The above automated analyzer in Patent Literature 1 makes the light generated in the flow cell reach the photodetector through the light transmission optical system while inhibiting a decrease in the amount of the light. However, this configuration has a problem that, to improve the SN ratio, the signal emission from a luminescence substance to be measured is to be separated from the background luminescence from a substance not to be measured.

The present inventors have studied a detection device for luminescence analysis using a light transmission optical system (equivalent to a highly reflective light-guide system mentioned later) and an optical filter. When the optical filter and the highly reflective light-guide system are mounted in the device in the study, the pressure from the highly reflective light-guide system is locally applied to the thin disc-like optical filter. Thus, a problem has arisen that the optical filter is broken. Alternatively, a problem has arisen that the central axis of the highly reflective light-guide system or optical filter is misaligned relative to the photodetector or window material.

These problems increase deviation in amount of light emission of each device to deteriorate the lower limit of quantification of the device. There is also a problem that those problems cannot be visually checked after assembly of the device and replacement of the parts.

An object of the present invention is to provide a technique that can inhibit deterioration of the lower limit of quantification of a device by increasing an SN ratio and a light detection efficiency and preventing breakage of an optical filter and misalignment of the central axis of a highly reflective light-guide system or the optical filter relative to a photodetector or a window material.

The above and other objects and new characteristics will become clear from the present description and the appended drawings.

Solution to Problem

The summary of a typical configuration in the invention disclosed in the present application is briefly explained below.

That is, a typical detection device for luminescence analysis has a member, a window material, a photodetector, a highly reflective light-guide system, and an optical filter. The member has an analysis area to conduct luminescence analysis of samples. The window material transmits light emitted from a sample in the analysis area.

The photodetector detects the light transmitted through the window material. The highly reflective light-guide system has a highly reflective light-guide surface to reflect the light that is emitted from a sample and that enters an entry port opposing the window material and to propagate the reflected light to an exit port opposing a light reception surface of the photodetector. The optical filter is provided to a space surrounded by the window material, photodetector, and highly reflective light-guide system. The optical filter transmits, to between the window material and photodetector, signal emission to be measured that is emitted from a sample.

The optical filter is fixed to the window material or photodetector by a positioning portion. An outer peripheral shape of the optical filter is smaller than an inner shape of a fitting portion to fit the optical filter formed to the highly reflective light-guide system.

Particularly the outer peripheral shape of the optical filter is such that the ratio of the area of the optical filter relative to the opening area of the entry port or exit port in the highly reflective light-guide system is 90% or more to less than 100%.

Advantageous Effects of Invention

An advantageous effect obtained by a representative configuration in the invention disclosed in the present application is briefly explained below.

The lower limit of quantification in a detection device for luminescence analysis can be inhibited from deteriorating.

BRIEF DESCRIPTION OF DRAWINGS

FIG. 2 is an explanatory view showing an example in a detection device for luminescence analysis studied by the present inventors.

FIG. 3 is an explanatory view of an important portion upon noticing propagation of light generated especially from an analysis area of the detection device for luminescence analysis of FIG. 2.

DESCRIPTION OF EMBODIMENTS

Figure 1:
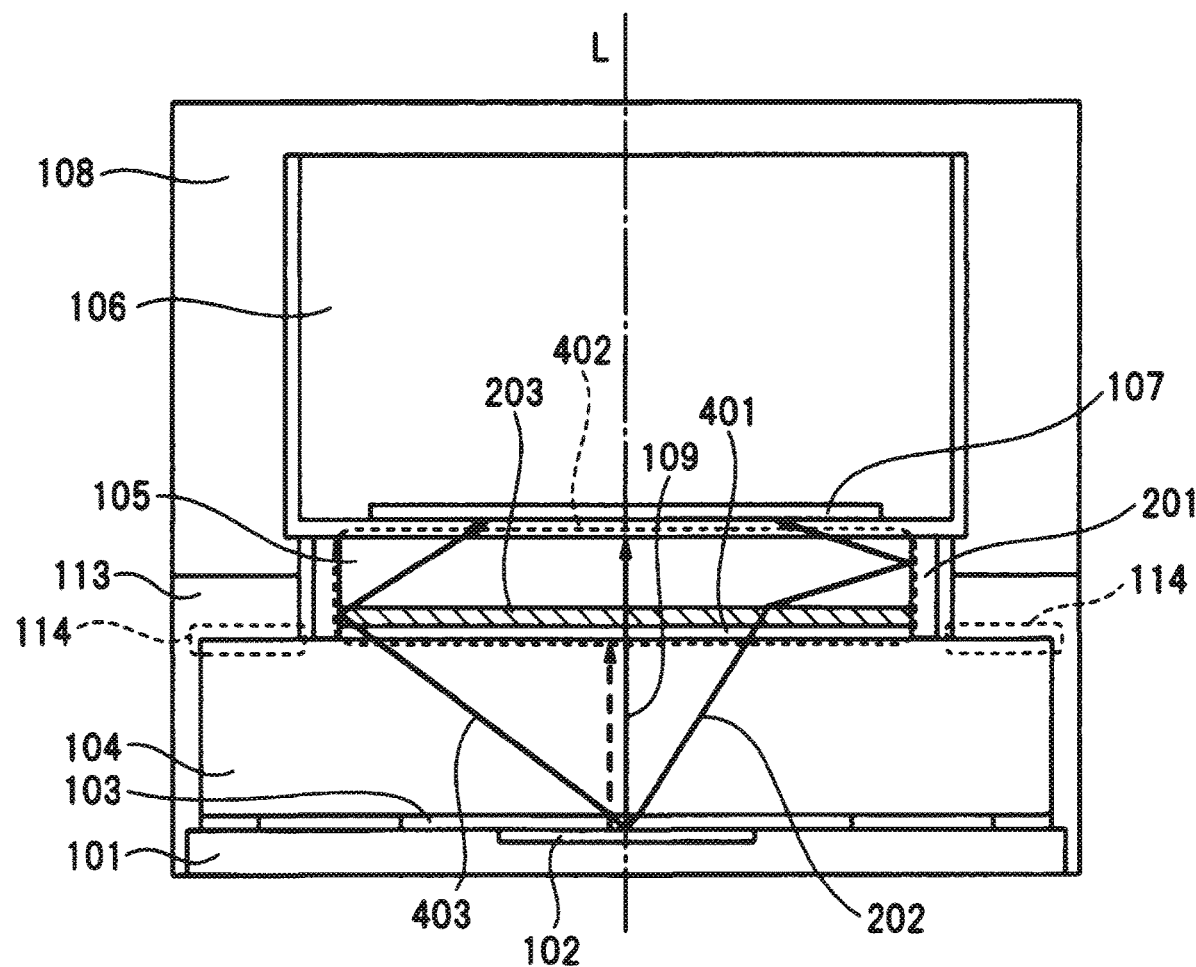
FIG. 1 is an explanatory view showing an example of a configuration in a detection device for luminescence analysis of a first embodiment.

The following embodiments are described by being divided into multiple sections or multiple embodiments as necessary for convenience. Unless clearly indicated, the embodiments are related to each other. This relationship is such that one embodiment is a partial or entire modification example, detail, or supplementary explanation of the other embodiment.

In the following embodiments, when numerals (including a number, values, amounts, and ranges) of components are described and unless clearly indicated and a specific numeral is clearly specified in principle, the numerals of components may be over or under the specific numeral without being limited to the specific numeral.

Further, in the following embodiments, the components (including component steps) are not necessarily required unless clearly indicated or the components are considered as clearly necessary in principle.

Similarly, in the following embodiments, when shapes or positional relationship of components are described, the shapes or the positional relationship include substantially approximate or similar ones unless clearly indicated or clearly considered to be different ones in principle. The same is true with respect to the above numerals and ranges.

In all the drawings for explanation of the embodiments, the same components are given the same reference signs in principle, and not repeatedly explained.

<Luminescence Analysis>

Luminescence analysis is one of the techniques used to analyze trace components, and has a higher sensitivity than absorption measurement in general, and is widely used in fields such as environmental analysis, pharmaceutical analysis, food analysis, and clinical trials. The luminescence herein signifies emission of light from an exciting material when the exciting material transitions to a ground state.

Luminescence is classified by factors of excitation of electrons. For example, the luminescence when electrons are excited by heat is heat luminescence, the luminescence when electrons are excited by optical irradiation is photoluminescence, and the luminescence when electrons are excited by voltage is electroluminescence. A detection device for luminescence analysis of the present embodiment includes a measurement container applicable to luminescence analysis of these various luminescence forms.

The embodiments are described below using the drawings.

Each embodiment is explained using, as an example, a case where the present invention is applied to the luminescence analysis using chemiluminescence. The chemiluminescence is also one form of luminescence, and is a phenomenon that a substance generated by chemical reaction emits light when transitioning from the excited state to the ground state. Bioluminescence of, e.g., a firefly, in which a chemical reaction is facilitated by enzyme, is one type of chemiluminescence.

For example, generally in the analysis using chemiluminescence, a solution mixed with at least one type of chemiluminescence reagents supplied via a corresponding liquid-sending procedure, namely a sample, is first supplied to a measurement container, and subjected to chemical reaction. After that, light emitted from the solution by chemiluminescence in the measurement container is detected by a photodetector using a photoelectric element such as a photomultiplier tube and a photodiode. The light is then converted to a current intensity in response to an amount of incident light by the photoelectric element. The luminescence intensity is measured based on the current intensity.

The emission wavelength of chemiluminescence is generally in the visible region (350 nm to 800 nm) in many cases. Therefore, the wavelength of signal emission is visible light in each embodiment. The configuration of the present application has the same advantageous effect by selecting a member matching wavelength characteristics even when the emission wavelength is outside the visible region.

First Embodiment

In the following embodiments, the present invention is explained as compared to a comparative art to illustrate features of the present invention.

First, the comparative art relative to the present invention is explained.

<Comparative Art Relative to the Present Invention>

Figure 4:
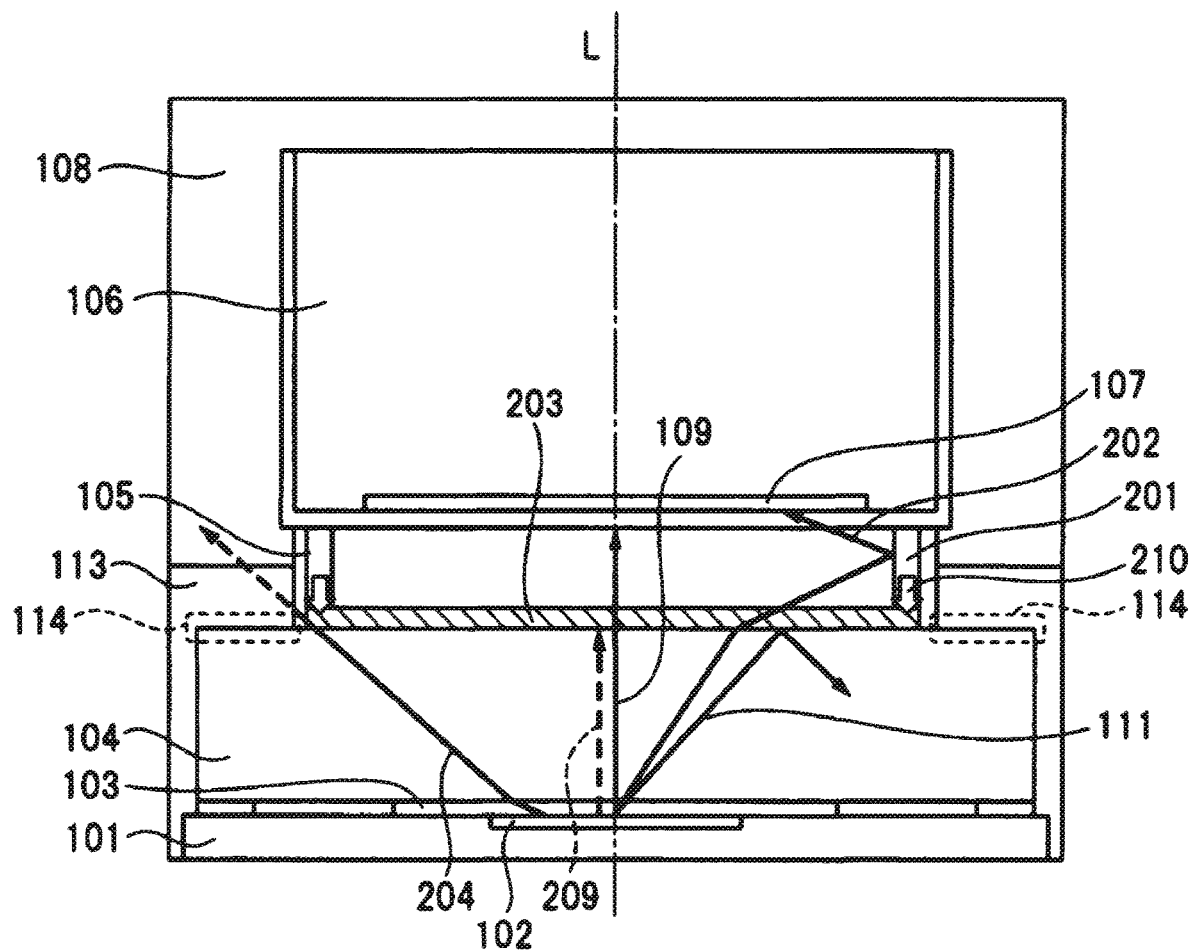
FIG. 4 is an explanatory view of a detection device for luminescence analysis to indicate a problem studied by the present inventors.

The comparative art relative to the present invention is explained using FIGS. 2 to 4.

FIG. 2 is an explanatory view showing an example in a detection device for luminescence analysis in accordance with the study by the present inventors. The detection device for luminescence analysis in FIG. 2 is a base model where an after-mentioned optical filter 203 and highly reflective light-guide system 201 of FIG. 4 are omitted, and is equivalent to a pre-product.

The detection device for luminescence analysis in FIG. 2 includes a cell base 101, a window material 104, a measurement container including an inner wall 112, a measurement container retaining member 113, a photodetector 106, and a photodetector retaining member 108.

The cell base 101 is a disc-like member having an analysis area 102 that conducts luminescence analysis of a sample to be analyzed, and forms a bottom of the detection device for luminescence analysis. The analysis area 102 opposes the photodetector 106 across the window material 104. Light emitted from a sample in the analysis area 102 is transmitted through the window material 104, and enters the photodetector 106.

In the detection device for luminescence analysis of FIG. 2, a diameter of the cell base 101 is about 50 mm, and the analysis area 102 has a rectangular shape of about 5 mm×5 mm in plain view. Then, luminescence analysis is performed to a sample in the analysis area 102. The analysis area 102 may be formed as a flow path to make a sample circulate in the analysis area 102.

The window material 104 is a disc-like member that forms the measurement container together with the cell base 101, and opposes the analysis area 102 via a cavity 103. The cavity 103 is a space having a predetermined thickness, namely a vertical size. The cavity 103 is surrounded by the cell base 101, window material 104, and inner wall 112.

The thickness of the cavity 103 is, for example, 0.5 mm. The cavity 103 covers the whole surface of the analysis area 102, and is filled with a fluid of a refractive index 1.33 that is the same as water at the time of luminescence analysis.

The window material 104 is a member that forms an optical window to observe light emitted from a sample of the analysis area 102 in the photodetector 106. The window material 104 is formed of a material that transmits light emitted from a sample in the analysis area 102, and covers the whole surface of the cavity 103. The window material 104 is formed of, for example, acrylic. Here, the window material 104 has a thickness, namely a vertical size, of about 4 mm, a diameter of about 45 mm, and a refractive index of about 1.49.

The measurement container retaining member 113 retains the measurement container. The measurement container retaining member 113 can be used to mechanically connect the detection device for luminescence analysis to an unillustrated external analyzer. The object other than the retaining and connection includes easy temperature control achieved by thermally connecting the measurement container to an unillustrated external temperature controller to perform high accurate analysis.

In this case, it is preferable to use a material having high thermal conductivity, such as aluminum and copper, as a material of the measurement container retaining member 113. To perform temperature control of the measurement container while efficiently detecting luminescence, it is preferable to cover "a side surface" of and "at least part of a top outer peripheral portion" of the window material 104.

The top outer peripheral portion signifies an outer peripheral portion in the top surface, namely in the surface opposing the photodetector 106. Another object includes protection of the measurement container. Further, as another object, external light unnecessary for measurement is prevented from entering the photodetector 106 through the measurement container and from being noise light.

The measurement container retaining member 113 is preferably matted and painted in black to efficiently attenuate external unnecessary light. In FIG. 2, aluminum is matted and painted in black as the material.

The temperature control for the measurement container retaining member 113 is such that an unillustrated external temperature controller using a Peltier device controls temperature of the measurement container. At this time, the side surface of the window material 104 and the donut-shaped top outer peripheral portion 114 except the region opposing a photosensitive surface 107 is covered to efficiently control temperature of the measurement container.

The photodetector 106 is a sensor that detects light transmitted through the window material 104, and can use, for example, a photomultiplier tube or a photo diode. For example, a photomultiplier tube is used herein.

The window material 104 has a cylindrical shape of about 28 mm in diameter. The photosensitive surface 107 that is a light reception surface is provided to the bottom of the photodetector 106. The photodetector 106 is externally connected via unillustrated wiring for inputting and outputting power from and to the outside. The photosensitive surface 107 is about 15 mm in diameter, and opposes the window material 104 via an air layer 105. The air layer 105 has a thickness, namely a vertical size, of about 3 mm and a refractive index of 1.00. The photodetector 106 is covered with the photodetector retaining member 108.

The photodetector retaining member 108 retains the photodetector 106. The photodetector retaining member 108 can also be used to mechanically connect the detection device for luminescence analysis to an unillustrated external analyzer. The object other than the maintenance and connection includes prevention of external light unnecessary for measurement from entering the photodetector 106 and from becoming noise light. In this case, it is at least required to cover the photodetector 106 that detects light.

The photodetector retaining member 108 is preferably matted and painted in black to efficiently decrease unnecessary external luminescence. The photodetector retaining member 108 may be integrated with the measurement container retaining member 113.

Another object includes prevention of characteristics of the photodetector 106 from changing due to the electromagnetic field applied from the outside. Thus, it is also possible to provide functions of a magnetic shield and an electric field shield. Further, a proper insulation material may be used to prevent glass in the photodetector 106 from emitting light. In this case, the insulation material includes PTFE (PoLy Tetra Fluoro Etylene).

In the above detection device for luminescence analysis, the light emitted from a sample in the analysis area 102 is transmitted through the cavity 103 and window material 104, and extracted to outside the measurement container or to the air layer 105 in FIG. 2.

The light emitted from the measurement container passes through the air layer 105, enters the photosensitive surface 107 of the photodetector 106, and is photoelectrically converted to an electrical signal. The surface of the cavity 103 for incident light, namely the top surface of the analysis area 102, the interface between the cavity 103 and window material 104, the interface between the window material 104 and air layer 105, and the photosensitive surface 107 are all substantially parallel to each other, and are horizontal in FIG. 2.

In FIG. 2, a signal emission 109 occurs from a luminescence substance to be measured, and travels at an angle of zero from the center of the analysis area 102. The angle herein is relative to a normal vector L passing through the center of the analysis area 102.

Such light travels in the water that fills the cavity 103, passes through the window material 104 and air layer 105, and reaches the photosensitive surface 107 without large loss.

In contrast, a signal emission 110 that occurs from a luminescence substance to be measured and travels from the center of the analysis area 102 at an angle in a predetermined range, for example, 25 degrees, travels in the water filling the cavity 103, and is refracted on the interface with the window material 104. Further, the signal emission 110 is refracted on the interface between the window material 104 and air layer 105, and reaches the photodetector retaining member 108 or measurement container retaining member 113. This causes large optical loss.

Thus, a primary factor of occurrence of the large optical loss is that the light emission from the analysis area 102 occurs from a fluid having the same refractive index as water. This is explained using FIG. 3.

FIG. 3 is an explanatory view of a main section upon noticing propagation of light generated especially from the analysis area 102 of the detection device for luminescence analysis of FIG. 2.

When the light emission from the analysis area 102 occurs from a cavity 1001 having the same refractive index of 1.00 as the air, one example of a determined light path is as illustrated in the left side of FIG. 3 in accordance with the Snell's law mentioned later. The light emission can be then propagated through the air layer 105 at the same angle as that of the emission from the analysis area 102. This light emission corresponds, for example, to light emission from gas such as a lean gaseous substance.

In contrast, in the detection device for luminescence analysis in FIG. 2, when the light emission from the analysis area 102 occurs from a fluid having the same refractive index as water, the light emission is propagated through the air layer 105 at a greater angle than that when emitted from the analysis area 102, as shown in the right side of FIG. 3.

Therefore, a ratio of the light reaching the photodetector retaining member 108 or measurement container retaining member 113 increases. In the detection device for luminescence analysis where the light emission is from a fluid as above, the light easily disperses from the central axis outwardly as compared with the light emission from a gas having the same refractive index as the air.

A signal emission 111 in FIG. 2 travels in the water filling the cavity 103, is refracted on the interface with the window material 104, and further totally reflected by the interface between the window material 104 and air layer 105. Therefore, the signal emission 111 cannot enter the air layer 105. Therefore, also in such a case, large optical loss occurs. Here, the signal emission 111 is generated from a luminescence substance to be measured and travels at a predetermined angle or more, for example, 50 degrees relative to the center of the analysis area 102.

Thus, the case when the signal emission that generates from a luminescence substance to be measured and exits from the analysis area 102 reaches the photosensitive surface 107, the case when the signal emission exits to the air layer 105 but does not directly reach the photosensitive surface 107, and the case when the signal emission is totally reflected between the window material 104 and air layer 105 and does not reach the air layer 105 are classified by an angle relative to the normal vector L of the light emitted from the analysis area 102.

The border value of this angle can be found from the Snell's law of the following formula.

$$n1 \cdot \sin \theta1 = n2 \cdot \sin \theta2$$

where n1 and n2 are refractive indexes of media 1 and 2, θ1 is an incident angle in medium 1, and θ2 is a refraction angle in medium 2.

In the detection device for luminescence analysis of FIG. 2, boundary values of the angles that classify the case when the above signal emission directly reaches the photosensitive surface, the case when the signal emission does not directly reach the surface, and the case when the signal emission does not reach the air layer are calculated as 38.5 degrees and 48.8 degrees, respectively.

Light 209 in FIG. 2 is background luminescence that generates from a luminescence substance not to be measured, and travels from the center of the analysis area 102 at an angle of zero. Such light generates from a pro-luminescent substance, impurity, a non-specific binding substance, or a non-specific absorption substance in a sample, and reaches the photodetector 106 as well as the signal emission from a measurement subject to reduce an SN ratio of measurement.

The above is explanation of the detection device for luminescence analysis used as the base model in FIG. 2.

FIG. 4 is an explanatory view of a detection device for luminescence analysis that indicates a problem studied by the present inventors. The same portions as in FIG. 2 are given the same reference signs in FIG. 4, and not explained.

The detection device for luminescence analysis of FIG. 4 includes a configuration having the highly reflective light-guide system 201 and optical filter 203 added to the base model in FIG. 2.

The optical filter 203 shown by hatching includes a thin disc-like member. The optical filter 203 uses difference in wavelength characteristic of transmissivity to more efficiently transmit the signal emission 109 from a measurement subject in the light emitted from a sample than the light 209 that is background luminescence from a non-measurement subject.

Therefore, since the SNR of measurement is improved, it is possible to improve the lower limit of quantification of the device. The material of the optical filter 203 generally uses glass. The optical filter 203 also uses glass as material and uses a common absorption filter. The optical filter 203 is about 0.5 mm in thickness and about 22 mm in diameter.

Example of Configuration of Highly Reflective Light-Guide System

Figure 5:
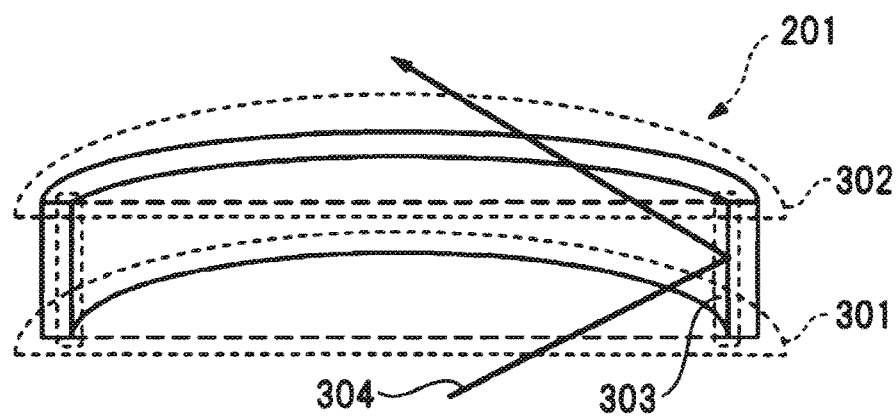
FIG. 5 is an explanatory view showing an example of a highly reflective light-guide system of the detection device for luminescence analysis of FIG. 4.

The highly reflective light-guide system 201 is explained using FIG. 5.

FIG. 5 is an explanatory view showing an example of the highly reflective light-guide system 201 of the detection device for luminescence analysis of FIG. 4.

The highly reflective light-guide system 201 includes a hollow cylinder shape as in FIG. 5, and has an outer diameter of about 22 mm, an inner diameter of about 20 mm, and a height of about 3.0 mm.

Its inner surface includes a highly reflective light-guide surface 303 having a high reflectivity. The highly reflective light-guide system 201 reflects light 304 that enters an entry port 301, and emits the light 304 from an exit port 302 on the opposite side. The reflective surface is formed to the inner surface of the highly reflective light-guide system 201 in FIG. 5, but may be formed to the outer surface.

The highly reflective light-guide surface 303 includes a base material to which a high reflectivity material is formed. The high reflectivity material uses spatter or plate of metal ions, such as aluminum and gold, or a reflective film. The base material is formed of molding resin such as acrylic or glass.

The spatter or plate of metal ions, which is a high reflectivity material, has a reflectivity of about 85%. The reflective film has about several hundred microns in thickness and a reflectivity of about 90% or more.

The highly reflective light-guide system 201 of FIG. 5 uses glass as base material, the inner surface of which is spattered using gold for film deposition.

The highly reflective light-guide surface 303 has preferably a reflectivity of 85% or more, more preferably, at least 80% or more to efficiently propagate the light of a wavelength to be measured.

In the configuration of the detection device for luminescence analysis having the highly reflective light-guide system 201, emitted light 202 can be reflected by the highly reflective light-guide surface 303 to reach the photodetector retaining member 108 or measurement container retaining member 113, and propagated to the photodetector 106 without being absorbed. Therefore, the optical detection efficiency can be improved.

<Problems>

Then, problems in the detection device for luminescence analysis in FIG. 4 are explained.

First, the first problem is explained. Each position of the photodetector 106, highly reflective light-guide system 201, optical filter 203, and window material 104 in FIG. 4 needs to be spatially fixed to prevent the light emitted from a sample in a liquid and transmitted through the window material 104 from unnecessarily dispersing and to increase mechanical stability of the system.

However, in the configuration as in FIG. 4, since the highly reflective light-guide systems 201 has a solid member such as a resin mold product or glass, pressure 210 from the highly reflective light-guide system 201 having a hollow shape is locally applied to the thin disc-shaped optical filter 203. Therefore, a problem may arise that the optical filter 203 is damaged or broken.

The breakage of the optical filter 203 changes optical transmissibility characteristics of the optical filter 203 through dispersion and absorption of light due to broken pieces. This increases variation in light emission amount in each device to deteriorate the lower limit of quantification of the device. The deterioration of the lower limit of quantification due to an increase in variation in emission amount in each device is after mentioned.

To avoid breakage of the optical filter 203, the highly reflective light-guide system 201 may be spaced, that is, distanced from the optical filter 203 or window material 104.

However, in that case, a problem arises that signal emission leaks from the space, and thus is absorbed by the photodetector retaining member 108 or measurement container retaining member 113. Absorption loss and reflective loss during propagation increase with the increase in optical propagation distance because the analysis area 102, which is the light emission portion, is distanced from the photodetector 106. This causes a problem that optical transmissibility decreases. Further, external light that cannot be sufficiently absorbed by the photodetector retaining member 108 or measurement container retaining member 113 reaches the photodetector 106 to become noise light.

To avoid breakage of the optical filter 203, a buffer material may be also inserted between the highly reflective light-guide system 201 and the optical filter 203 or the window material 104. However, the cost price of the device increases by the buffer material. Further problems include: reduction in amount of light due to an increase in the distance between the analysis area 102, which is the light source, and the photodetector 106 and; absorption loss of light due to the buffer material itself.

Then, the second problem includes misalignment of the central axis of the highly reflective light-guide system 201 relative to the optical filter 203 and photodetector 106. The misalignment of the central axis changes reduction in optical loss by the highly reflective light-guide system 201. Variation in emission amount in each device increases to deteriorate the lower limit of quantification of the device mentioned later. Similarly, the central axis of the optical filter 203 may also be misaligned.

The third problem is that the misalignment of the highly reflective light-guide system 201 and optical filter 203 relative to the window material 104 or photodetector 106 and the breakage of the optical filter 203 are difficult to check after assembly of the device.

This is because, to prevent external light unnecessary for measurement from entering the photodetector 106 and becoming noise light as above, the highly reflective light-guide system 201, optical filter 203, window material 104, and photodetector 106 are covered with the photodetector retaining member 108 or measurement container retaining member 113. Thus, visual inspection of the inside of the device is difficult. Such a problem arises, for example, at the time of assembly of the device.

Then, the fourth problem is explained. The measurement container including the analysis area 102, window material 104, and cell base 101 in the detection device for luminescence analysis is subject to reagents of various pHs in analysis, provides a place for various reactions, and may be applied electrical current.

Therefore, the present measurement container, which is loaded at the time of measurement, is preferably replaced each predetermined number of measurements in general. However, also in replacement of the measurement container as well as in assembly of the device, problems arise that the highly reflective light-guide system 201 and optical filter 203 are misaligned with the window material 104 or photodetector 106 and that the optical filter 203 is broken.

The replacement is not made in a factory where the device is assembled. A sales representative, who is not a specialist, or a user of the device performs the replacement outside the factory. Such problems are serious.

The fifth problem includes an increase in optical loss due to the thickness of the optical filter. That is, since the optical filter 203 has a predetermined thickness, the light that passes through the end surface of the optical filter 203 and is absorbed by the photodetector retaining member 108 or measurement container retaining member 113 exists. This is a signal emission 204 (FIG. 4) that generates, for example, from a luminescence substance to be measured and that travels in the direction of a predetermined angle from the end of the analysis area 102.

Particularly when the measurement container retaining member 113 covers the top outer peripheral portion 114 of the window material 104 for efficient temperature control, the measurement container retaining member 113 is disposed near the optical filter 203. Therefore, the absorption in the measurement container retaining member 113 becomes large.

As a factor of such large absorption, the light emission from the analysis area 102, which is the light source, is emitted from the liquid area in the detection device for luminescence analysis as explained in FIG. 3.

Additionally, unlike an absorbance meter using a directive light source like laser, the light emission from the analysis area 102, which is the light source, is basically a diffused light source, that is, emitted in various directions.

In detection for luminescence analysis, the temperature of the measurement container is preferably controlled. In such a configuration, the analysis area 102, which is the light source, is spaced from the photosensitive surface 107, which is a light reception portion, by the thickness of the optical filter 203. This reduces the amount of received light on the photosensitive surface 107.

The deterioration in the lower limit of quantification of a device due to an increase in deviation of devices is explained here. According to the guideline of CLSI (Clinical and Laboratory Standards Institute EP17-A, Vol. 24, No. 34, page 18), the lower limit of quantification of a device is an analyte concentration where a relative total error is equal to a limit CV value (for example, about 10 to 20%). The relative total error is defined as a sum of a systematic error of, e.g., a difference between devices and a constant multiple of standard deviation in a low concentration sample. Therefore, an increase in a difference between devices directly leads to an increase in the lower limit of quantification.

Example of Configuration of Detection Device for Luminescence Analysis

Then, the present inventors have found that the above problem is soluble using the configuration shown in FIG. 1 as a result of study.

FIG. 1 is an explanatory view showing an example of a configuration in the detection device for luminescence analysis of the first embodiment. In FIG. 1, the same portions are given the same reference signs as in FIG. 4 mentioned above, and not explained. The detection devices for luminescence analysis are used in fields such as clinical trials, pharmaceutical analysis, food analysis, and environmental analysis.

The detection device for luminescence analysis of FIG. 1 has a configuration where the optical filter 203 is adhered to the window material 104 using an adhesive 401 in contrast to the configuration of the detection device for luminescence analysis in FIG. 4. The optical filter 203 is thus positioned relative to the window material 104. The adhesive 401 includes an acrylic UV-(ultraviolet rays) cured adhesive agent.

The optical filter 203 exists in a space 402 surrounded by the window material 104, highly reflective light-guide system 201, and photodetector 106. Here, "the space surrounded by the window material 104, highly reflective light-guide system 201, and photodetector 106" forms a space closed by contacting the entry port 301 (FIG. 5) of the highly reflective light-guide system 201 to the window material 104 and by contacting the exit port 302 (FIG. 5) of the highly reflective light-guide system 201 to the photodetector 106.

In the detection device for luminescence analysis of FIG. 4, the window material 104 is not in contact with the highly reflective light-guide system 201. Therefore, the space is not closed. The highly reflective light-guide system 201 is disposed to be fitted to the optical filter 203 in this space.

The outer diameter of the optical filter 203 may be about 19.9 mm. This is about 99.5% in size relative to about 20 mm that is the inner diameter of the highly reflective light-guide system 201. That is, the outer diameter of the optical filter 203 is made smaller than the diameter of the entry port 301 in the highly reflective light-guide system 201. The entry port 301 is the fitting portion (to be fitted) with the optical filter 203.

With such a configuration, the optical filter 203 is present in the space surrounded by the window material 104, highly reflective light-guide system 201, and photodetector 106. Breakage of the optical filter 203 can be inhibited by making the outer diameter of the optical filter 203 smaller than the entry port diameter of the highly reflective light-guide system 201.

The optical filter 203 is adhered to the window material 104 by using the adhesive 401. The optical filter 203 is thus positioned relative to the window material 104, and aligned to the central axis. The highly reflective light-guide system 201 is disposed in this space to be fitted with the optical filter 203. This allows the spatial positions of the optical filter 203 and highly reflective light-guide system 201 to be fixed. As a result, the axial alignment relative to the window material 104 and photodetector 106 is possible.

That is, with the configuration of the detection device for luminescence analysis of FIG. 1, the central axis of the highly reflective light-guide system 201 can be aligned to the window material 104, photodetector 106, and optical filter 203.

Further, with the above positioning and fitting, misalignment of the highly reflective light-guide system 201 and optical filter 203 relative to the window material 104 or photodetector 106 and breakage of the optical filter 203 do not need to be visually checked after assembly of the device and at replacement of the parts.

The increase in the above optical loss due to the thickness of the optical filter 203 is also canceled. That is, light 403 that reaches the end surface of the optical filter 203 is reflected by the highly reflective light-guide system. 201 after reaching the end surface. This prevents the light 403 from unnecessarily dispersing and from being absorbed by the photodetector retaining member 108 or measurement container retaining member 113.

Particularly, since the temperature of the measurement container is controlled, optical loss by the measurement container retaining member 113 can be inhibited even when the measurement container retaining member 113 covers the top outer peripheral portion 114 of the window material 104.

The distance between the analysis area 102 and photosensitive surface 107 that is the light reception portion does not increase by the thickness of the optical filter 203. Therefore, light can reach the photosensitive surface 107 without significant loss.

Further, the distance becomes short by the thickness to enable miniaturization of the detection device for luminescence analysis.

Therefore, such a configuration can avoid the misalignment of the highly reflective light-guide system 201 and optical filter 203 relative to the window material 104 or photodetector 106 in the detection device for luminescence analysis, and can avoid breakage of the optical filter 203.

As a result, the detection device for luminescence analysis having a high SN ratio and high photo detection efficiency and being capable of inhibiting deterioration of the lower limit of quantification of the device can be provided.

The adhesive 401 can use various adhesives such as an epoxy adhesive or thermosetting adhesive in addition to the above acrylic UV-cured adhesive agent. However, it is preferable to select an adhesive agent in consideration of mutual adhesive properties of base materials to be adhered, such as acrylic of the window material 104 and glass of the optical filter 203. It is preferable to use a material having a high optical transmissibility for signal emission from a sample.

The adhesive 401 may use a double-sided tape. By using a double-sided tape, adhesion can be repeatedly made. Particularly, when the optical filter can be reused in the measurement container that is a replaceable part, the cost of the measurement container as a replaceable part can be reduced.

It is preferable to use a material having high transmissivity for signal emission from a sample as a double-sided tape. It is preferable that the transmissivity of the adhesive 401 is at least 85% or more, more preferably 90% or more to efficiently propagate light of a wavelength to be measured.

By optically contact, that is, adhering the window material 104 and optical filter 203 without sandwiching an air layer between the window material 104 and optical filter 203, the adhesive 401 has also an advantageous effect of inhibiting Fresnel reflection or total reflection of light on the surface of the window material 104 to make the light efficiently reach the optical filter 203. Such positioning using adhesion holding optical contact is indispensable also to acquire an advantageous effect of a light extraction layer mentioned later.

The positioning art uses the adhesive 401. It is also possible to provide a slot portion to fit the optical filter 203 to the window material 104. In such a configuration, the positioning of the optical filter 203 and window material 104 becomes easy by fitting the optical filter 203 to the slot portion.

When a photomultiplier tube is used as the photodetector 106, a further advantageous effect is obtained. That is, without changing a light source, namely the distance between the analysis area 102 and photodetector 106, the thickness of the air layer between the top surface of the optical filter 203 and the photodetector 106 can be increased by the depth of the slot portion. Here, the top surface of the optical filter 203 signifies the surface facing the photodetector 106.

In general, an unillustrated cathode is provided above the photosensitive surface 107 of the photomultiplier tube to collide electrons generated on the photosensitive surface 107. Typically, a high voltage of about minus 1000 v is applied to this cathode.

Therefore, it is known that, when a layer having a great potential difference relative to the cathode is present on the surface on the photomultiplier tube toward the photosensitive surface, namely on the surface of the photodetector 106 toward the air layer 105, glass emits light through a strong electric field effect. The layer having the great potential difference includes an electrode layer fixed to a ground potential or a grounding point.

The light emission of this glass causes a great noise of the photomultiplier tube. Therefore, the air layer 105 that is the insulating layer between the above-mentioned top surface of the optical filter 203 and the photodetectors 106 is made thick by the depth of the slot portion. It is thus possible to realize noise reduction in analysis.

For the detection device for luminescence analysis of FIG. 1, the case where the photomultiplier tube is applied to the photodetector 106 is explained as the example. For example, a different photoelectric element such as a photo diode is also applicable.

However, when the photodetector 106 uses the photomultiplier tube, "adhesion of the optical filter 203 to the window material 104" has the following advantage relative to "adhesion of the optical filter 203 to the photodetector 106."

That is, when the optical filter 203 is adhered to the photomultiplier tube, handling needs care to first avoid breakage of a glass tube in consideration of a hollow glass tube generally used as the material forming the outside of the photomultiplier tube.

In the adhesion process of the optical filter 203, exposure of the photosensitive surface 107 of the photomultiplier tube to a large amount of external light may cause irreversible degradation of the photosensitive surface 107. In contrast to the technique "adhesion of the optical filter 203 to the photomultiplier tube," "adhesion of the optical filter 203 to the window material 104" can remove those risks.

The thickness of the optical filter 203 is preferably from about 0.2 mm or more to about 2.0 mm or less. When the thickness is less than 0.2 mm, variation in accuracy of glass processing becomes great to be a factor of errors between devices. Therefore, it may be difficult to provide a highly accurate detection device for luminescence analysis. Additionally, the handling is also difficult in consideration of adhesion. This may cause breakage in adhesion.

In contrast, when the thickness of the optical filter 203 is greater than 2.0 mm, the transmissivity of the optical filter decreases to decrease the photo detection efficiency. It is unlikely for the optical filter 203, having a sufficient thickness, to break due to pressing force of the highly reflective light-guide system 201.

Particularly, the thickness of the optical filter 203 is preferably from about 0.5 mm or more to about 1.5 mm or less. When the thickness is 0.5 mm or more, it is easy to select from commercially available optical filters.

<Breakage Prevention Effect for Optical Filter>

When the optical filter is 1.5 mm or less, the breakage prevention effect for the optical filter in the configuration of the detection device for luminescence analysis of FIG. 1 is notably acquired. Here, this is explained using FIG. 6.

Figure 6:
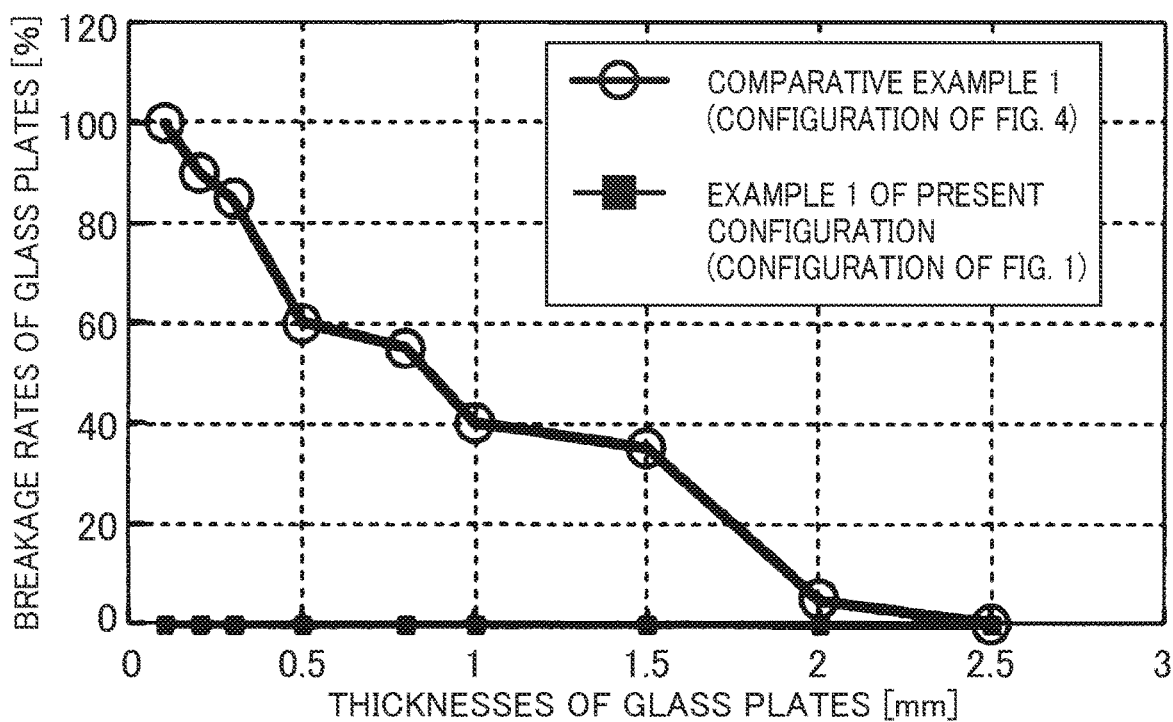
FIG. 6 is an explanatory view showing relationship between a thickness of an optical filter and a breakage ratio of the optical filter.

FIG. 6 is an explanatory view showing relationship between the thickness of the optical filter and the breakage ratio of the optical filter. FIG. 6 shows relationship between the thickness of the optical filter and the breakage rate of the optical filter when the optical filter and the highly reflective light-guide system 201 are mounted twenty times in the detection device for luminescence analysis of FIG. 4 and the detection device for luminescence analysis of FIG. 1.

In FIG. 6, the line graph indicated by circles for Comparative Example 1 illustrates the relationship in the detection device for luminescence analysis of FIG. 4. The line graph indicated by squares for Example 1 of the present configuration illustrates the relationship in the detection device for luminescence analysis of FIG. 1. The optical filters use glass plates having the same thickness to test only the influence of the thickness.

As in FIG. 6, in the configuration of FIG. 4 in Comparative Example 1, when the thickness of the glass plate is 2 mm or less, breakage occurs, and the breakage rate exceeds 35% particularly in the thickness of 1.5 mm or less. In contrast, in the configuration of FIG. 1 in Configuration 1 of the present application, no breakage occurs regardless of the thickness of the glass plate.

This result may indicate that the glass plate receives no pressure in Example 1 of the present configuration. The number of broken filters may depend on the technique level of the operator. The configuration of the detection device for luminescence analysis of FIG. 1 can easily mount the optical filter and highly reflective light-guide system.

<Effectiveness of Detection Device for Luminescence Analysis>

Figure 7:
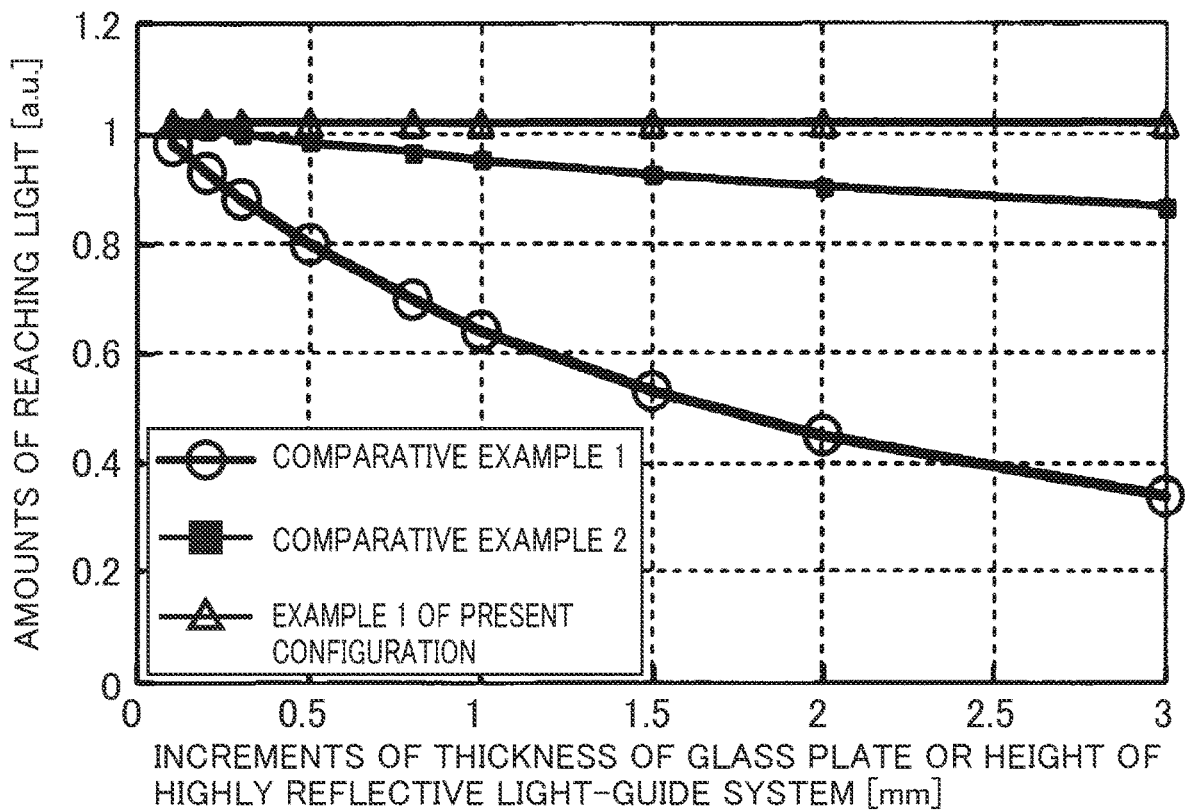
FIG. 7 is an explanatory view showing a result of an optical simulation in the detection device for luminescence analysis of FIG. 1.

An optical simulation has been performed to check effectiveness of the detection device for luminescence analysis of FIG. 1. FIG. 7 is an explanatory view showing a result of the optical simulation in the detection device for luminescence analysis of FIG. 1.

FIG. 7 shows a simulation result of amounts of light (relative value) reaching the photodetector 106 when the thickness of the optical filter or the increment in the height of the highly reflective light-guide system is changed in each configuration of Comparative Example 1, Comparative Example 2, and Example 1 of the present configuration.

In FIG. 7, Comparative Example 1, the line graph indicated by circles, illustrates the case of the detection device for luminescence analysis of FIG. 4. Comparative Example 2, the line graph indicated by squares, illustrates the case where the height of the highly reflective light-guide system 201 is increased by a predetermined thickness (hereinafter called a highly reflective light-guide system height increment) instead of disposing the optical filter in the detection device for luminescence analysis of FIG. 4. Example 1 of the present configuration, the line graph indicated by triangles, illustrates the case of the detection device for luminescence analysis of FIG. 1.

For example, in Comparative Example 2, the height of the highly reflective light-guide system 201 is 3.1 mm when the highly reflective light-guide system height increment is 0.1 mm and added to the original height (3.0 mm) of the highly reflective light-guide system 201. The height of the highly reflective light-guide system in Comparative Example 1 and Example 1 of the present configuration is always 3 mm.

To check only the effect of the thickness, glass plates having different thicknesses are substituted for the optical filter. FIG. 7 illustrates that the amount of detected light greatly decreases as the thickness of the glass plate increases in Comparative Example 1.

This is considered to be due to reduction in the amount of the light leaked from the end surface of the glass plate and absorbed by the measurement container retaining member 113 and due to reduction in the amount of the light directly reaching the photodetector 106 from the analysis area 102 as the thickness of the glass increases.

Here, in Comparative Example 2 where only the height of the highly reflective light-guide system 201 is increased, reduction in the amount of light relative to the increase in the highly reflective light-guide system height increment is smaller than that in Comparative Example 1. This may be because that the most of the optical loss in Comparative Example 1 is due to "the amount of light leaked from the end surface of the glass plate and absorbed by the measurement container retaining member 113."

In Example 1 of the present configuration, even when the thickness of the glass plate is increased, reduction in the amount of light is not seen at all. Therefore, in Example 1 of the present configuration, it is possible to dispose the optical filter having a required thickness without reduction in the amount of light.

The detection device for luminescence analysis of FIG. 1 uses one optical filter, but may use two or more optical filters having different wavelength characteristics, such as one long wavelength cut filter and one short wavelength cut filter. In that case, the thickness of the optical filter 203 is a total value of the thicknesses of all layered filters.

The inner peripheral shape of the entry port or exit port and the outer peripheral shape of the optical filter are circular. The outer diameter of the optical filter is preferably 95% or more of the inner diameter of the entry port or exit port that forms the fitting portion with the optical filter.

The ratio of the area of the optical filter relative to the inner peripheral opening area of the entry port or exit port at this time is $(90\%)^2 \approx 90\%$. With the selection of such diameters, the alignment of the optical filter and the highly reflective light-guide system becomes possible with a constant precision.

Here, the shapes of the optical filter and the entry port or exit port of the highly reflective light-guide system are circular, but may use any shape such as a square.

However, to enable certain fitting and alignment between the optical filter and the entry port or exit port of the highly reflective light-guide system and to obtain the advantageous effect of the first embodiment, the ratio of the area of the optical filter relative to the inner peripheral opening area of the entry port or exit port is preferably 90% or more (less than 100%), and more preferably 98% or more (less than 100%). This specifically signifies that "the outer diameter of the optical filter 203 is made smaller than the diameter of the exit port of the highly reflective light-guide system 201" as described above.

The configuration of the detection device for luminescence analysis of FIG. 1 is different from a configuration having an optical filter disposed in a lens tube of a microscope or telescope. The optical system in which an optical filter is disposed in a microscope or a telescope is generally a collimating optical system. Therefore, a problem does not arise that the distance between a window material and a photodetector is to be held constant. Additionally, a problem does not arise that the distance is made constant to reduce a luminescence intensity difference between devices and to improve the lower limit of quantification.

An object of systems of a microscope and a telescope is imaging using a lens. It is thus preferable that light other than the light for imaging does not enter a photodetector. Therefore, a common system having a lens tube whose inner surface is painted in black to remove external unnecessary light (stray light) is different from the system where, as in the first embodiment, a light transmission optical system having the high reflective surface to perform the opposite action to the removal of stray light is disposed in the detection device for luminescence analysis covered with the photodetector retaining member or measurement container retaining member that removes stray light.

Further, in the systems of a microscope and telescope, temperature control as performed to the measurement container retaining member is not performed to the lens tubes. Therefore, there is no problem of light absorption loss due to the measurement container retaining member for temperature control.

Second Embodiment

<Example of Configuration of Detection Device for Luminescence Analysis>

Figure 8:
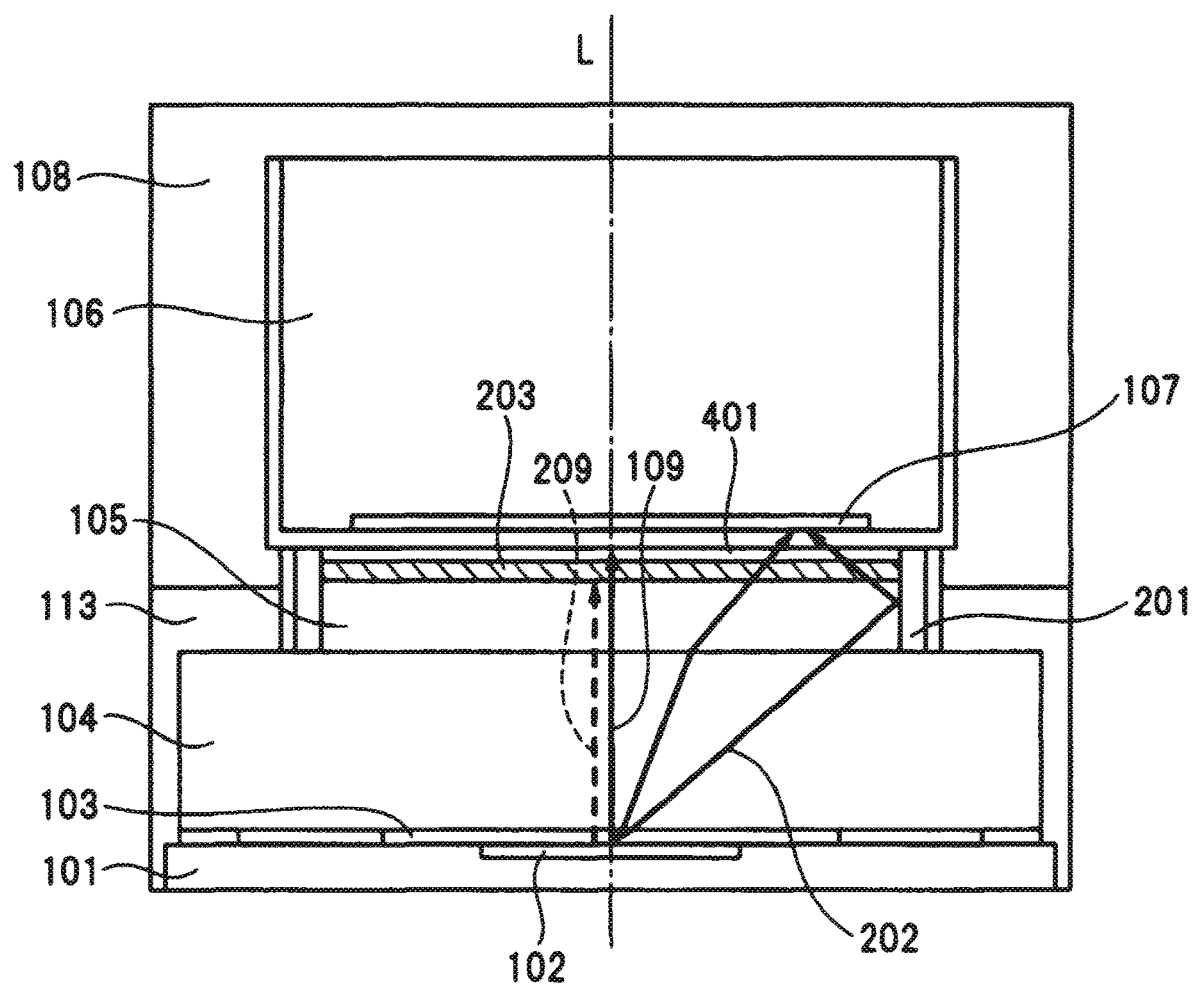
FIG. 8 is an explanatory view showing an example of a configuration in a detection device for luminescence analysis of a second embodiment.

FIG. 8 is an explanatory view showing an example of a configuration in a detection device for luminescence analysis of a second embodiment. In FIG. 8, the same portions are given the same reference signs as FIG. 1 mentioned above, and not explained.

The detection device for luminescence analysis of FIG. 8 is different from FIG. 1 of the first embodiment in that the optical filter 203 is adhered to the photodetector 106 via the adhesive 401.

With this configuration, the same advantageous effect as in the first embodiment can be acquired. That is, the optical filter 203 is present in the space surrounded by the window material 104, highly reflective light-guide system 201, and photodetector 106. This can prevent the light transmitted through the window material from unnecessarily dissipating and being absorbed and lost by the photodetector retaining member 108 or measurement container retaining member 113.

Further, the outer diameter of the optical filter 203 is made smaller than the diameter of the exit port of the highly reflective light-guide system 201. Thus, in addition to the alignment of the central axis, the optical filter 203 can be prevented from being broken.

The optical filter 203 is adhered to the photodetector 106 by using the adhesive 401 to position the optical filter 203 relative to the photodetector 106 and to align the central axis. The highly reflective light-guide system 201 is disposed to be fitted to the optical filter 203 in this space. Then, the spatial positions of the optical filter 203 and highly reflective light-guide system 201 are fixed. The axial alignment thus becomes possible also relative to the window material 104 and photodetector 106.

That is, the central axis of the highly reflective light-guide system 201 can be aligned to the window material 104, photodetector 106, and optical filter 203 in the configuration in FIG. 8. Further, with the above positioning and fitting, it becomes unnecessary, after assembly of the device and at replacement of the parts, to prevent misalignment of the highly reflective light-guide system. 201 and optical filter 203 relative to the window material 104 or photodetector 106 and to visually check breakage of the optical filter 203.

Therefore, it becomes possible to avoid misalignment of the highly reflective light-guide system. 201 and optical filter 203 relative to the window material 104 or photodetector 106 and breakage of the optical filter 203 in the detection device for luminescence analysis. Therefore, the detection device for luminescence analysis having a high SN ratio and high photo detection efficiency and inhibiting deterioration of the lower limit of quantification of the device can be thus provided.

Further, "adhesion of the optical filter 203 to the photodetector 106" has the following advantages relative to "adhesion of the optical filter 203 to the window material 104." That is, by adhering the optical filter 203 to the photodetector 106, the optical filter 203 can be separated from the measurement container that is a replacement part. Therefore, an increase in the cost price of the measurement container can be inhibited.

Third Embodiment

Example of Configuration of Detection Device for Luminescence Analysis

Figure 9:
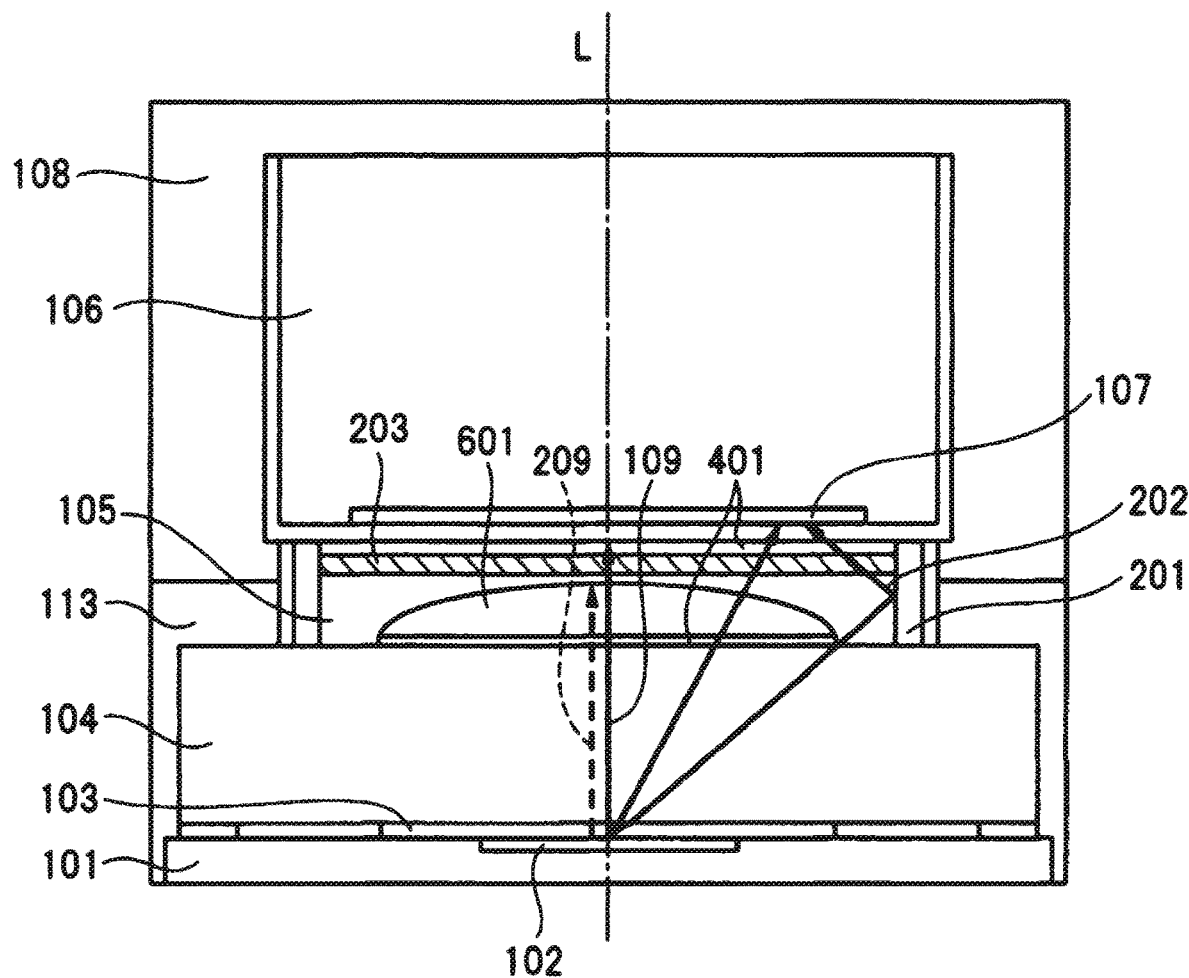
FIG. 9 is an explanatory view showing an example of a configuration in a detection device for luminescence analysis of a third embodiment.

FIG. 9 is an explanatory view showing an example of a configuration in a detection device for luminescence analysis of a third embodiment. Also in FIG. 9, the same portions as FIG. 1 of the first embodiment are given the same reference signs, and not explained.

The detection device for luminescence analysis of FIG. 9 is different from the detection device for luminescence analysis of FIG. 8 in the second embodiment in that a lens 601 is inserted on the window material 104 via the adhesive 401 as a light extraction layer.

The lens 601 is about 15.0 mm in diameter, about 75 mm in focal length, about 1.83 mm in center thickness, and about 38.8 mm in radius of curvature, and is formed of, for example, an acrylic material.

The adhesive 401 to adhere the window material 104 to lens 601 aims to prevent the air layer from incorporating between the lens 601 and window materials 104. This can prevents total reflection.

With the configuration in FIG. 9, the same advantageous effect as the second embodiment can be acquired. In addition, it has been found that the lens 601 improves luminescence intensity 2.1 times through an optical simulation. That is, it is possible to efficiently propagate luminescence from the window material 104 to the photodetector 106 by using the lens 601. This is because refraction of the light emitted from lens 601 between the air layer 105 and lens 601 can be inhibited in FIG. 9. That is, the total reflection loss on the interface with the air layer 105 can be inhibited. Compared with a case where the lens 601 is not disposed, a reflection loss due to reflection of light in the highly reflective light-guide system 201 after the light passes through the interface with the air layer 105 and light leakage from the end surface of the optical filter can be inhibited.

The following advantageous effects are acquired by using the lens 601.

That is, with retaining the air layer 105 between the window material 104 and photodetector 106, it becomes possible to increase the photo detection efficiency. As above, when the surface of the photomultiplier tube toward the photosensitive surface, namely the surface of the photodetector 106 toward the air layer 105, has a layer having a great potential difference relative to the cathode, the glass emits light due to a strong field effect, which becomes a factor of a great noise of the photomultiplier tube. The layer having a great potential difference relative to the cathode is an electrode layer fixed to a ground potential or a grounding point, for example.

Therefore, noise reduction in analysis is realizable by retaining the air layer 105 which is the insulating layer. That is, noise reduction and improvement in photo detection efficiency can be both made by the lens 601. In the configuration in FIG. 9, the optical filter 203 is adhered to the surface of the photodetector 106 toward the air layer 10. The optical filter 203 may be adhered to the surface of the window material 104 toward the photodetector 106, and then the lens 601 may be layered on the optical filter 203. Also in this case, improvement in the above photo detection efficiency is possible. The air layer 105 that is an insulating layer is held between the top surface of the lens 601 as well as the top surface of the optical filter 203 not covered with the lens 601 and the photodetector 106, thereby noise reduction in analysis can be achieved.

Fourth Embodiment

<Example of Configuration of Detection Device for Luminescence Analysis>

Figure 10:
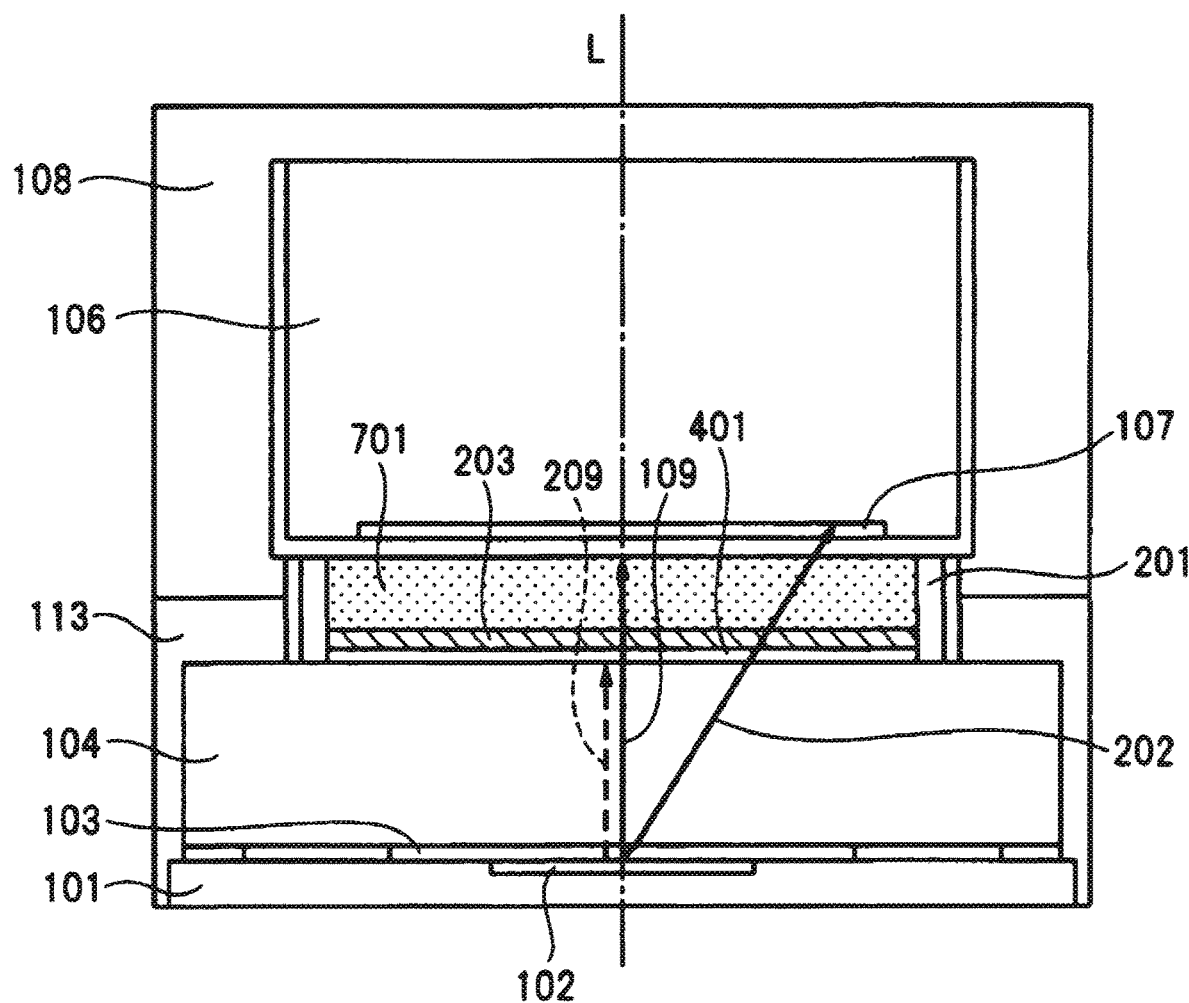
FIG. 10 is an explanatory view showing an example of a configuration in a detection device for luminescence analysis of a fourth embodiment.

FIG. 10 is an explanatory view showing an example of a configuration in a detection device for luminescence analysis of a fourth embodiment. Also in FIG. 10, the same portions as FIG. 1 of the above embodiment are given the same reference signs, and not explained.

The detection device for luminescence analysis in FIG. 10 is different from the detection device for luminescence analysis of FIG. 1 of the first embodiment in that an index matching material 701 shown by dots of FIG. 10 is inserted between the optical filter 203 and photodetector 106 as a light extraction layer to fill the hollow portion of the highly reflective light-guide system 201.

The index matching material 701 used as a refraction portion includes a material having a similar refractive index in the range of 1.35 to 1.65 to those of plastic and glass. The index matching material 701 is preferably a flexible rubber material having flexibility, namely elastic property, to ensure adhesion to peripheral members.

The adhesion to peripheral members signifies optical contact. That is, the air layer 105 having a low refractive index is not inserted therebetween. Thus, on the basis of a slight refractive index difference between each interface of the window material 104, adhesive 401, optical filter 203, index matching material 701, and photodetector 106 and on the basis of the Snell's law, refraction of light is greatly inhibited to slightly generate. Therefore, since a reflection loss or a total reflection loss due to refraction at the interface with the air layer does not occur, it is possible to efficiently propagate light emission from the window material 104 to the photodetector 106.

The specific material includes silicone rubber, nitrile rubber, ethylene propylene rubber, acrylic rubber, urethane rubber, fluoride rubber, or chloroprene rubber.

With such a configuration, the same advantageous effect as the first embodiment can be acquired. Optical simulation has indicated that the luminescence intensity is improved 3.5 times by the index matching material 701 in the configuration in FIG. 10.

When the index matching material 701 is used, unlike a case where a lens is used as a light extraction layer, the index matching material 701 is in contact with the window material 104 and photodetector 106 by the adhesiveness and elastic properties of a rubber material. Therefore, the index matching material 701 can be easily detached at replacement of the measurement container. In assembly of the device and re-attachment of the measurement container, the index matching material 701 can be advantageously mounted without using the adhesive.

In addition, a risk of breakage due to pressure applied to the photodetector 106 and window material 104 by the hollow-shaped highly reflective light-guide system 201 can be reduced by the elastic properties of the index matching material. In the configuration in FIG. 10, the optical filter 203 is adhered to the surface of the window material 104 toward the air layer 105. The optical filter 203 may be adhered to the surface of the photodetector 106 toward the air layer 105, and the index matching material 701 may be superimposed between the optical filter 203 and window materials 104. Also in this case, improvement in the above photo detection efficiency is possible. It is also possible to easily detach the index matching material 701 at replacement of the measurement container. Further, an advantage is maintained that the index matching material 701 can be advantageously mounted without using the adhesive in assembly of the device and re-attachment of the measurement container.

Fifth Embodiment

<Example of Configuration of Detection Device for Luminescence Analysis>

Figure 11:
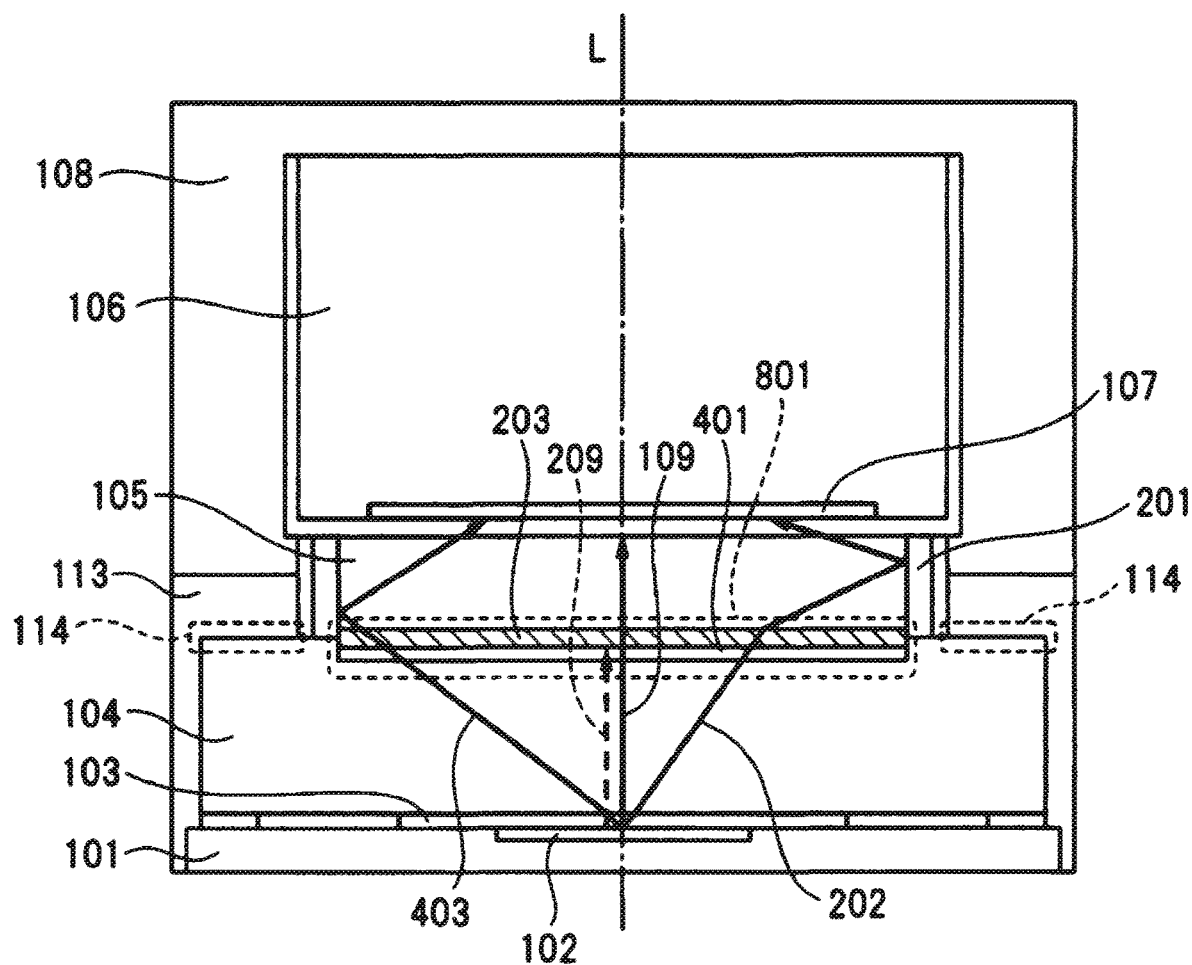
FIG. 11 is an explanatory view showing an example of a configuration in a detection device for luminescence analysis of a fifth embodiment.

FIG. 11 is an explanatory view showing an example of a configuration in a detection device for luminescence analysis of a fifth embodiment. Also in FIG. 11, the same portions as FIG. 1 of the first embodiment are given the same reference signs, and not explained.

The detection device for luminescence analysis in FIG. 11 is different from the detection device for luminescence analysis of FIG. 1 in that the optical filter 203 and adhesive 401 are inserted to a slot portion 801 provided to the window material 104 to be positioned to the window material 104. The inner diameter of the slot portion 801 is about 20.0 mm, for example.

With such a configuration, the same advantageous effect as the first embodiment can be acquired. In addition, in the detection device for luminescence analysis of FIG. 11, the optical filter 203 can be easily aligned to the window material 104 by inserting the optical filter 203 to the slot portion 801.

Since the photodetector 106 uses a photomultiplier tube, the air layer 105 can be increased in thickness by the depth of the slot portion 801 without changing the light source, namely the distance between the analysis area 102 and photodetector 106. Here, the air layer 105 is an insulating layer between the top surface of the optical filter 203 toward the photodetector 106 and the photodetector 106.

Therefore, noise reduction in analysis can be realized by increasing the thickness of the air layer 105 by the depth of the slot portion 801.

The adhesive 401 is provided between the optical filter 203 and the top surface of the slot portion. Generally, the top surface of a slot portion is roughened once after slot processing. Such a configuration can ensure optical contact, namely adhesion between the roughened top surface of the slot portion and the optical filter 203.

Sixth Embodiment

<Example of Configuration of Automated Analyzer>

Figure 12:
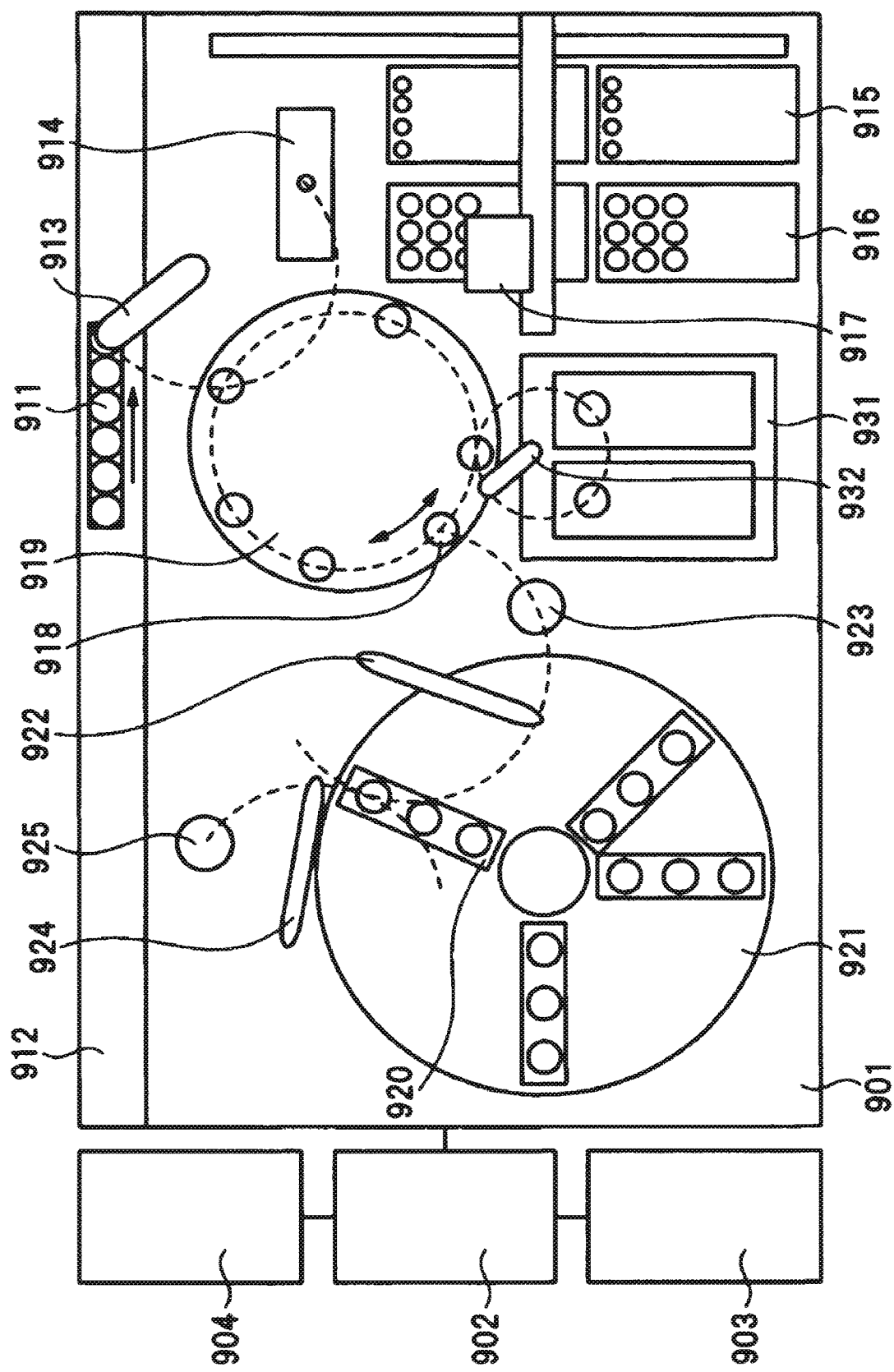
FIG. 12 is a plan view schematically showing an example of a configuration in an automated analyzer of a sixth embodiment.

FIG. 12 is a schematic plan view showing an example of a configuration in an automated analyzer of a sixth embodiment.

The automated analyzer is a device that analyzes an organic liquid sample such as blood and urine. To sensitively analyze an organic liquid sample, an art of selectively recognizing analyte components from a sample including many coexistence components is indispensable.

For example, in a cancer marker and an immunoassay that analyzes an antigen and an antibody in an infection virus or a hormone as analyte samples, many protein components (for example, about 70 g/L) coexist in serum, and in contrast, the analyte components have a trace amount in the order of f (femto) mol/L to n (nano) mol/L.

Such an organic sample analysis requiring high sensitivity uses an art that a substance selectively bound to an analyte component is used to selectively label and isolate the analyte.

For example, in the sandwich method generally performed in immunoassay, the analysis is conducted through the following processes (1) to (3).

(1) A first antibody bound to magnetic particles and a second antibody bound to a luminescent label are mixed with an antigen of an analyte and then bound to the antigen by antigen-antibody reaction.

(2) The magnetic particles are magnetically caught using a permanent magnet to discharge coexisting components not bound to the magnetic particles outwardly of the reaction container.

(3) The luminescent label bound to the magnetic particles emits light to measure the emission intensity depending on concentration of the antigen of the analyte.

The automated analyzer in FIG. 12 includes an analysis portion 901, a control portion 902, an input portion 903, and a display 904. The analysis portion 901 conducts analysis. The control portion 902 controls the whole device. The input portion 903 inputs user information. The display 904 displays information.

The input portion 903 may use the display 904. This example includes a touch panel monitor.

The analysis portion 901 includes a transport mechanism 912, a sample probe 913, a chip attachment/detachment portion 914, a chip magazine 915, a reaction container magazine 916, a chip/reaction container transport mechanism. 917, an incubator 919, a reagent disc 921, a reagent dispensing probe 922, a reagent probe cleaning portion 923, a magnetic particle stirring mechanism 924, a magnetic particle stirring mechanism cleaning portion 925, a detection device 931, and a dispensing probe 932 for detection device.

The transport mechanism 912 is a device that transports the sample container 911 containing a sample to the sample dispensing position. The sample probe 913 is a device that dispenses a sample. The chip attachment/detachment portion 914 is a device that attaches and detaches a disposable chip to and from the sample probe 913.

The chip magazine 915 is a device that supplies a disposable chip. The reaction container magazine 916 is a device that supplies a reaction container. The chip/reaction container transport mechanism 917 is a device that transports a disposable chip and a reaction container.

The incubator 919 is a device that can retain a reaction liquid in a reaction container at a constant temperature and that includes multiple openings 918. The reagent disc 921 is a device that retains the reagent container 920 containing an analysis reagent.

The reagent dispensing probe 922 is a device that dispenses an analysis reagent to the incubator 919. The reagent probe cleaning section 923 is a device that cleans the reagent dispensing probe 922 with water or a cleaning liquid.

The magnetic particle stirring mechanism 924 is a device that stirs an analysis reagent containing magnetic particles before the analysis reagent is dispensed. The magnetic particle stirring mechanism cleaning portion 925 is a device that cleans the magnetic particle stirring mechanism 924 with water or a cleaning liquid.

The detection device 931 performs luminescence detection. The dispensing probe 932 for detection device is a device that dispenses a reaction liquid to the detection device 931. Multiple bottles for each of common reagents such as a luminescence reagent, a cleaning liquid, and a probe cleaning liquid are stored in the automated analyzer. The bottles include spare bottles. Each reagent is supplied to the mechanism corresponding to the reagent through a reagent tube inserted to each bottle.

For example, any one of the detection device for luminescence analysis of the first embodiment and the detection device for luminescence analysis of the second embodiment can be applied to the detection device 931 that is a detection device for luminescence analysis. FIG. 1 includes an unillustrated electric signal processing circuit that extracts electric information from the photodetector 106.

Next, schematic analysis processing of the automated analyzer is explained.

First, a reaction container supplied from the reaction container magazine 916 is disposed to the incubator 919. A measurement reagent containing magnetic particles is stirred by the magnetic particle stirring mechanism 924, and the magnetic particles are suspended in the reaction container.

Then, the measurement reagent containing the magnetic particles and a measurement reagent containing the first antibody are dispensed and mixed in the reaction container by the reagent dispensing probe 922, and subject to incubation for a predetermined time.

Then, the sample container 911 containing a sample is transported to a sample dispensing position by the transport mechanism 912. A disposable chip is mounted to the sample probe 913 at the chip attachment/detachment portion 914. The sample is dispensed to the reaction container on the incubator 919 by the sample probe 913. Then, a measurement reagent containing the second antibody is dispensed to the reaction container by the reagent dispensing probe 922, and subject to incubation for a predetermined time.

Then, the fluid in the reaction container is dispensed to the detection device 931 by the dispensing probe 932 for detection device, and subject to luminescence analysis in the detection device 931. The measurement result obtained by the luminescence analysis is displayed on the display 904.

The detection device for luminescence analysis of each above embodiment can effectively increase the amount of detection light. Thus, by applying the detection device to the automated analyzer of FIG. 12, analytes can be measured and analyzed with high sensitivity.

The detection device for luminescence analysis has a simple configuration, and can be easily unitized. Easy replacement and maintenance of the detection device can be thus made periodically. Further, a desired advantageous effect can be obtained by any combination of each of the above embodiments.

As above, the invention achieved by the present inventors is specifically explained based on the embodiments, but is not limited to the embodiments. Various modifications are possible without departing from the spirit of the present invention.

The present invention is not limited to the above embodiments, and includes various modifications. For example, the above embodiments are explained in detail to easily explain the present invention, but the present invention is not necessarily limited to embodiments including all the explained configurations.

Part of the configuration of a certain embodiment can be replaced with the configuration of another embodiment. The configuration of a certain embodiment can be added the configuration of another embodiment. Part of the configuration of a certain embodiment can be subject to addition, deletion, and replacement of another configuration.

LIST OF REFERENCE SIGNS

101 . . . cell base
102 . . . analysis area
103 . . . cavity
104 . . . window material
105 . . . air layer
106 . . . photodetector
107 . . . photosensitive surface
108 . . . photodetector retaining member
112 . . . inner wall
113 . . . measurement container retaining member
114 . . . top outer peripheral portion
201 . . . highly reflective light-guide system
203 . . . optical filter
301 . . . entry port
302 . . . exit port
303 . . . highly reflective light-guide surface
401 . . . adhesive
601 . . . lens
701 . . . index matching material
801 . . . slot portion
901 . . . analysis portion
902 . . . control portion
903 . . . input portion
904 . . . display
911 . . . sample container
912 . . . transport mechanism
913 . . . sample probe
914 . . . chip attachment/detachment portion
915 . . . chip magazine
916 . . . reaction container magazine
917 . . . chip/reaction container transport mechanism
919 . . . incubator
920 . . . reagent container
921 . . . reagent disc
922 . . . reagent dispensing probe
923 . . . reagent probe cleaning section
924 . . . magnetic particle stirring mechanism 925 . . . magnetic particle stirring mechanism cleaning section
931 . . . detection device
932 . . . dispensing probe for detection device

The invention claimed is:

1. A detection device for luminescence analysis comprising:
   a base having an analysis area;
   an optical window formed of a material that transmits light emitted from a sample in the analysis area and having a slot portion having a bottom surface closer to the base than a portion of the optical window surrounding the slot portion;
   a photodetector configured to detect a signal in the emitted light;
   a hollow light-guide having a cylindrical shape and contacting the portion of the optical window surrounding the slot portion, an entry port in contact with the optical window, an exit port in contact with the photodetector, and a reflective inner surface disposed between the entry port and the exit port; and
   an optical filter provided in the slot portion of the optical window in a space defined by the slot portion of the optical window, the photodetector, and the light-guide, and which transmits the signal in the emitted light between the optical window and the photodetector,
   wherein the optical filter is directly attached to the slot portion of the optical window via an adhesive,
   wherein an outer dimension of the optical filter is smaller than an inner dimension of the entry port of the light-guide,
   wherein a distance from the bottom surface of the slot portion of the optical window to the photodetector is greater than a distance from the portion of the optical window surrounding the slot portion, and which is in contact with the light guide, to the photodetector, and
   wherein a ratio of an area of the optical filter relative to an opening area of the entry port or the exit port of the light-guide is between 90% to less than 100%.

2. The detection device for luminescence analysis according to claim 1,
   wherein the photodetector is a photomultiplier tube.

3. The detection device for luminescence analysis according to claim 1,
   wherein a thickness of the optical filter is between 0.2 mm to 2.0 mm.

4. The detection device for luminescence analysis according to claim 3 comprising:
   a measurement container including the base and the optical window; and
   a measurement container retaining member having a shape corresponding to the measurement container and that covers at least part of a top outer peripheral surface of the optical window.

5. The detection device for luminescence analysis according to claim 4,
   wherein an inner peripheral shape of the entrance port or the exit port of the light-guide and an outer peripheral shape of the optical filter are both circular, and a ratio of an area of the optical filter relative to an opening area of the entry port or the exit port of the light-guide is between 95% to less than 100%.

6. The detection device for luminescence analysis according to claim 4 further comprising:
   a lens to collect light transmitted through the window material,
   wherein the lens is disposed on the optical filter disposed on the window material or on the window material.

7. The detection device for luminescence analysis according to claim 4 further comprising:
   an index-matching material disposed between the optical filter and the window material or the photodetector to reduce refraction of light.

8. An automated analyzer comprising:
   a reagent dispensing probe that dispenses a reagent to a reaction container;
   a detection device for luminescence analysis that conducts luminescence analysis of a sample; and
   a dispensing probe for detection device that dispenses a reaction liquid in the reaction container to the detection device for luminescence analysis as the sample; and
   a display that displays a measurement result obtained by the detection device for luminescence analysis,
   the detection device for luminescence analysis including:
   a base having an analysis area to receive the sample;
   an optical window formed of a material that transmits light emitted from the sample in the analysis area and having a slot portion having a bottom surface closer to the base than a portion of the optical window surrounding the slot portion;
   a photodetector configured to detect a signal in the emitted light;
   a hollow light-guide having a cylindrical shape and contacting the portion of the optical window surrounding the slot portion, an entry port in contact with the optical window, an exit port in contact with the photodetector, and a reflective inner surface disposed between the entry port and the exit port; and
   an optical filter provided in the slot portion of the optical window in a space defined by the slot portion of the optical window, the photodetector, and the light-guide, and which transmits the signal in the emitted light,
   wherein the optical filter is directly fixed to the optical window via an adhesive
   wherein, in the case where the optical filter is fixed to the optical window, an outer dimension of the optical filter is smaller than an inner dimension of the entry port of the light-guide,
   wherein a distance from the bottom surface of the slot portion of the optical window to the photodetector is greater than a distance from the portion of the optical window surrounding the slot portion, and which is in contact with the light guide, to the photodetector, and
   wherein a ratio of an area of the optical filter relative to an opening area of the entry port or the exit port of the light-guide is between 90% to less than 100%.

* * * * *